R. S. LENE.
HORSE COLLAR.
APPLICATION FILED OCT. 11, 1920. RENEWED AUG. 2, 1922.

1,430,513.

Patented Sept. 26, 1922.

Inventor,
Reinhold S. Lene,
By Joseph A. Mintura
Attorney.

Patented Sept. 26, 1922.

1,430,513

UNITED STATES PATENT OFFICE.

REINHOLD S. LENE, OF LEXINGTON, NEBRASKA, ASSIGNOR OF ONE-HALF TO HARPHAM BROTHERS COMPANY, OF LINCOLN, NEBRASKA, A CORPORATION OF NEBRASKA.

HORSE COLLAR.

Application filed October 11, 1920, Serial No. 416,130. Renewed August 2, 1922. Serial No. 579,237.

*To all whom it may concern:*

Be it known that I, REINHOLD S. LENE, a citizen of the United States, residing at Lexington, in the county of Dawson and State of Nebraska, have invented new and useful Improvements in Horse Collars, of which the following is a specification.

Farmers and others who work draft animals often find it desirable and necessary to change animals and would find it cheaper and more convenient to use the same collar, but are prevented by the fact that an ill fitting one is injurious. A collar too short makes the neck sore, while one that is too long injures the shoulders, and no adjustable collar has so far proved commercially satisfactory.

The object of my invention is to provide an attachment which will not require a special make of collar, but which can be easily applied to and used to advantage with those now on the market to secure a range of adjustment of several inches in collars of the usual stock sizes and makes.

A further object is to fully protect the animal's neck at all times and at all adjustments by ample thicknesses of leather, and to make the collar easily removable from the animal and so the pads will be evenly balanced and not come off the collar without the exertion of some effort on the part of the hostler.

I accomplish the above and other objects which will hereinafter appear, by the construction illustrated in the accompanying drawing, in which—

Figure 1:
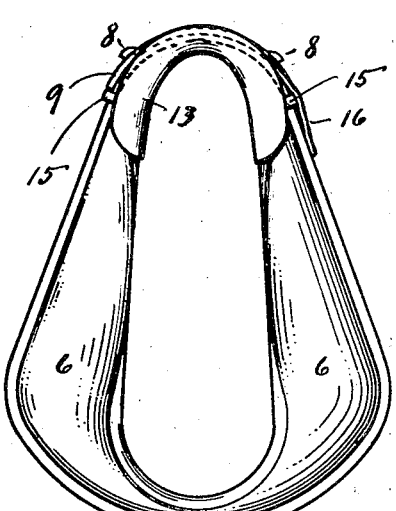
Figure 2:
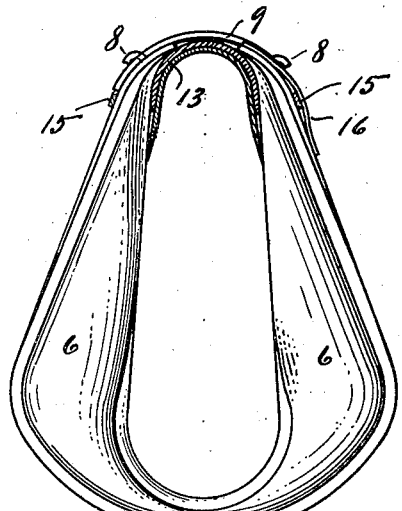
Figure 3:
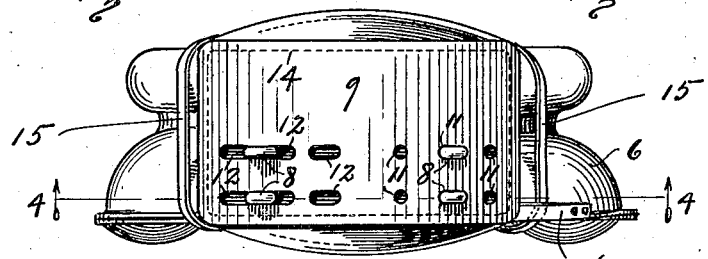
Figure 4:
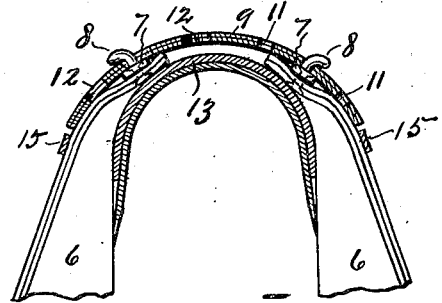
Figure 5:
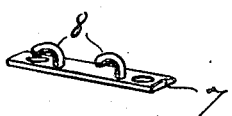

Fig. 1 is a view of that side of a collar which contacts the shoulders of the animal, with my invention applied. Fig. 2 is a like view of the collar showing the inner pad in vertical section. Fig. 3 is a top plan view of a collar with my attachments, the view being on a larger scale and Fig. 4 is a section of the top portion of same on the line 4—4 of Fig. 3. Fig. 5 is a perspective view of the hooks for holding the outer pad.

Referring to the drawings in which like characters of reference indicate like parts in the several views, 6 is a horse-collar of any usual or suitable construction, the upper end of which is split or open forming two collar-ends, to each of which a metal plate 7, is riveted. Each plate has a pair of outwardly bent hooks 8, 8, and 9 is an outer connector, preferably formed of two thick pieces of leather stitched together as shown by the dotted lines 14 in Fig. 3. On one side of the middle of the connector 9, are three pairs of round holes 11, to receive hooks 8, 8, of that side of the collar, and on the opposite side of the middle of the connector are three pairs of slots 12, which are adapted by successive pairs, to receive the pair of bent hooks on that side of the collar. Elongated openings are used on this side instead of round ones to facilitate the introduction and removal of the hooks in harnessing and unharnessing the animal, but the close-fitting round holes on the other side hold the connector so it will not come off without the exertion of appreciable effort.

Inside of the upper end of the collar is a second or inner pad 13, of two thicknesses of heavy leather of inverted U-shape from end to end and bent transversely to form an outside channel in which the top portion of the collar and outer connector 9 are assembled, and by which the neck and withers of the animal are protected. The two leathers forming the pad are stitched together at 14 and at each end of the pad is a loop 15, through which a corresponding end of the collar is passed. Complete removal of the inner pad 13, from the collar is prevented by an overlying strap 16 placed longitudinally of the collar and riveted to the latter at its ends but having space for freedom of movement of strap 15 between the rivets.

The operation of my invention is as follows: With the hooks in the intermediate position shown in the drawing, suppose it is desired to make the collar shorter and smaller; the slots of connector 9 are disengaged from hooks 8 and the released end moved out and the hooks on the other side of the collars disengaged from their holes 11 and moved to the holes nearer the middle of the connector. The opposite end of the collar is slipped out of its loop 15 and the collar placed on the animal. Then the free end of the collar is inserted under its strap 15 and the hooks carried by it are passed through the inner pair of slots and spring into engagement with the connector at the ends of the slots by the weight of the collar and spring of the leather. By a similar operation any series of holes or combination of them within the compass of the collar can be utilized.

Having thus fully described my invention, what I claim as new and wish to secure by Letters Patent of the United States, is—

1. The combination with a collar split at the top, connector-securing hooks in pairs transversely of the collar in the collar-ends formed by the split, an outside connector having a series of holes to receive said hooks and fasten the collar-ends to the connector at different distances apart of the ends, an adjustable pad opposite the split and on the inside of the collar, and loops secured to the pad and loosely receiving the collar-ends between the respective loops and pad.

2. The combination with a collar split at the top, bars secured to the collar-ends formed by the split, said bars having one or more outwardly turned hooks, and outside connector having a plurality of round holes at different distances in one end of the length of the connector and a plurality of slots in the other end of the connector to receive said hooks and fasten the collar-ends to the connector at different distances apart, and a pad adjustable at both ends independently of the outside connector located on the inside of the collar opposite the split.

3. The combination with a collar split at the top, bars secured to the collar-ends and each having a pair of hooks, an outside connector having a series of pairs of holes to receive said hooks at different distances of the connector, an inside pad with end loops loosely embracing the collar-ends and means to prevent the complete removal of one of the loops from the collar.

Signed at Lexington, Nebraska, this the 4 day of Oct. 1920.

REINHOLD S. LENE.